(No Model.) 2 Sheets—Sheet 1.
G. S. STRONG.
METHOD OF MAKING CAR WHEELS.
No. 402,696. Patented May 7, 1889.
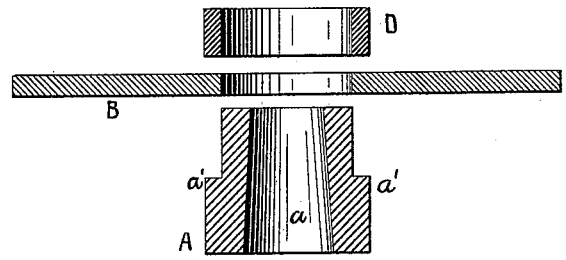
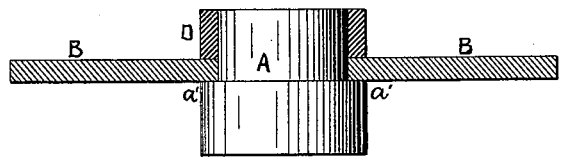
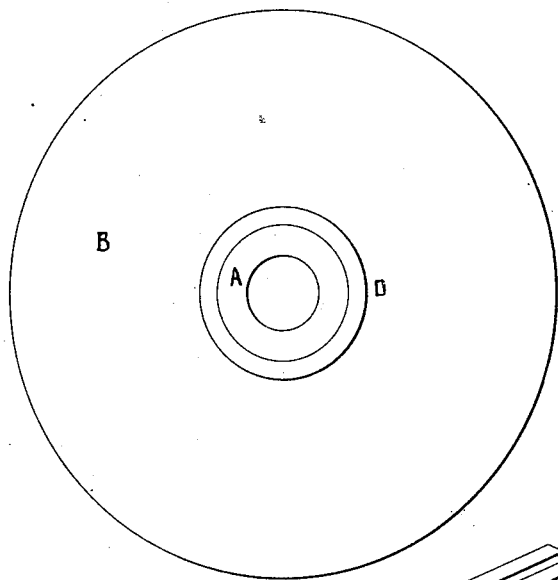
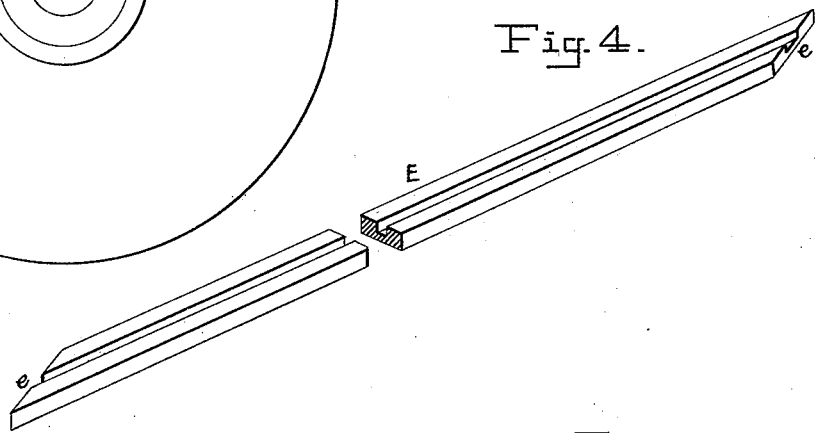
Witnesses:
E. J. Griswold.
John Revell.
Inventor:
Geo. S. Strong
By his Attorneys, Howson & Howson (No Model.) 2 Sheets—Sheet 2.
G. S. STRONG.
METHOD OF MAKING CAR WHEELS.

No. 402,696. Patented May 7, 1889.

Witnesses:
E. J. Griswold
John Revell

Inventor:
Geo. S. Strong
By his Attorneys
Howson & Howson

UNITED STATES PATENT OFFICE.

GEORGE S. STRONG, OF NEW YORK, N. Y.

METHOD OF MAKING CAR-WHEELS.

SPECIFICATION forming part of Letters Patent No. 402,696, dated May 7, 1889.

Application filed August 2, 1888. Serial No. 281,746. (No model.)

*To all whom it may concern:*

Be it known that I, GEORGE S. STRONG, a citizen of the United States, and a resident of New York city, New York, have invented an Improved Method of Making Car-Wheels, of which the following is a specification.

My invention consists of an improved method of manufacturing car-wheels by the process of welding the parts together under pressure.

Figure 5:
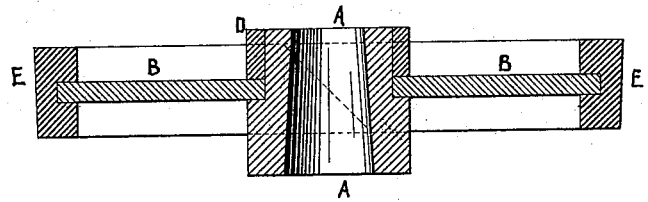
Figure 6:
Figure 7:
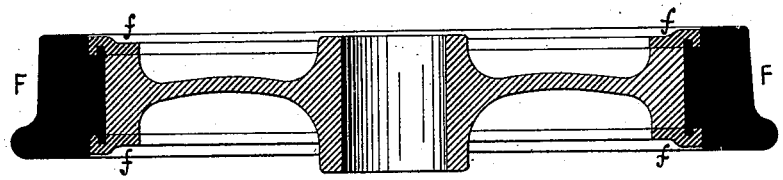

In the accompanying drawings, Figure 1 is a sectional view of the separate parts which are to form the hub and web of the wheel. Fig. 2 is a view, partly in section, of the same parts put together. Fig. 3 is a face or plan view of the same. Fig. 4 is a perspective view of the bar from which the rim of the wheel is to be formed. Fig. 5 is a sectional view of the wheel with the rim applied to the web. Fig. 6 is a corresponding sectional view of these parts after having been welded together under pressure. Fig. 7 is a similar sectional view after the tire has been applied, and Fig. 8 is another sectional view drawn to a larger scale and illustrating another mode of securing the tire in place.

In carrying out my invention I first form a hub-piece, A, Fig. 1, preferably with a tapering bore, $a$, and with a part of reduced diameter, leaving a shoulder, $a'$. Over this hub is placed a circular plate, B, with a central opening, $b$, which fits over the smaller end of the hub-piece A. A retaining-ring, $b$, of about the same diameter externally as the larger end of the hub-piece A, is then driven onto the smaller end of the hub-piece A to retain the plate B in place, as shown in Fig. 2. These parts may now be welded together, if desired, although I prefer to delay the welding until the rim has been put on and to weld all the parts together at once.

The part which is to form the rim of the wheel is made of a grooved bar, E, Fig. 4, of sufficient length to be bent entirely around the circumference of the plate B, the rim of which fits in the groove $e$ of the bar. The ends of this bar are preferably scarfed, as shown in Fig. 4, so that when the bar is fitted around the periphery of the plate B the scarfed ends will meet, as indicated by the dotted line in Fig. 5. The several parts thus put together are now subjected to a welding heat and put in a suitable hydraulic press having dies of the proper shape, so that the wheel may be pressed up into the form illustrated in Fig. 6, with the hub, web, and rim all welded together. Onto the wheel thus formed a tire may be secured by any suitable means. Thus in Fig. 7 I have shown a tire, F, as secured by flanged plates $f$, applied on each side of the rim of the wheel and entering grooves in opposite sides of the tire.

Figure 8:
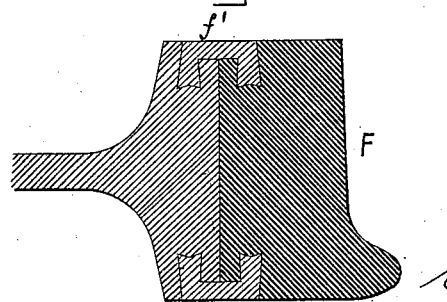

In Fig. 8 the tire is shown as secured to the rim of the wheel by annular rings $f'$, of U-shaped section. The legs of these sections enter annular grooves in both the rim of the wheel and the tire, while the outer face of each ring $f'$ is flush with the corresponding outer faces of the rim and tire.

I claim as my invention—

1. The mode herein described of forming car-wheels, said mode consisting in fitting over a hub-piece a web-plate having a central opening, securing the web-plate to the hub-piece by means of a ring fitted over a part of the hub-piece, and applying to the periphery of the web a grooved bar to form the tire, and welding these parts together.

2. The mode herein described of forming car-wheels, said mode consisting in securing a web-plate to a hub-piece, applying to the periphery of the web-plate a grooved bar overlapping the ends of the latter, and welding all the parts together, all substantially as set forth.

In testimony whereof I have signed my name to this specification in the presence of two subscribing witnesses.

GEO. S. STRONG.

Witnesses:
GEO. A. CRANE,
HUBERT HOWSON.